(12) United States Patent
Lansdowne

(10) Patent No.: US 8,576,883 B2
(45) Date of Patent: Nov. 5, 2013

(54) MEASUREMENT AND ADJUSTMENT OF REAL-TIME VALUES ACCORDING TO RESIDENCE TIME IN NETWORKING EQUIPMENT WITHOUT ACCESS TO REAL TIME

(75) Inventor: Richard James Lansdowne, Romsey (GB)

(73) Assignee: Semtech Corporation, Camarillo, CA (US)

( * ) Notice: Subject to any disclaimer, the term of this patent is extended or adjusted under 35 U.S.C. 154(b) by 295 days.

(21) Appl. No.: 12/861,467

(22) Filed: Aug. 23, 2010

(65) Prior Publication Data
US 2011/0051754 A1  Mar. 3, 2011

Related U.S. Application Data

(60) Provisional application No. 61/236,799, filed on Aug. 25, 2009.

(51) Int. Cl.
*H04J 3/06* (2006.01)
(52) U.S. Cl.
USPC .......................................................... 370/503
(58) Field of Classification Search
USPC .......................................................... 370/503
See application file for complete search history.

(56) References Cited

U.S. PATENT DOCUMENTS

| | | | |
|---|---|---|---|
| 4,885,554 A | 12/1989 | Wimmer | |
| 8,274,998 B2 * | 9/2012 | Belhadj et al. | 370/503 |
| 2005/0207387 A1 | 9/2005 | Middleton et al. | |
| 2006/0280182 A1 * | 12/2006 | Williams et al. | 370/394 |
| 2008/0075217 A1 * | 3/2008 | Ilnicki et al. | 375/356 |
| 2008/0298398 A1 * | 12/2008 | Eidson | 370/503 |
| 2009/0217074 A1 * | 8/2009 | Nichols et al. | 713/401 |

OTHER PUBLICATIONS

"Packet Synchronization in Cellular Backhaul Networks", Patrick Diamond; Semtech Corporation; Semtech White Paper, Oct. 2008; 7 pages.
"Single-Chip Master/Slave Timing Synchronization Solution for Legacy & Packet Networks", Semtech, ACS9510 ToPSync; Oct. 2008; 6 pages.
"Synchronizing Networks With IEEE 1588", Alexander Tan; National Semiconductor Corporation; Jul. 2009; 20 pages.
"Spider Transparent Clock", John C. Eidson et al; Stanford University; ISPCS 2008; International IEEE Symposium on Precision Clock Synchronization for Measurement, Control and Communication Ann Arbor, MI, Sep. 22-26, 2008; pp. 7-11.

* cited by examiner

*Primary Examiner* — Mark Rinehart
*Assistant Examiner* — Maharishi Khirodhar
(74) *Attorney, Agent, or Firm* — O'Melveny & Myers LLP

(57) ABSTRACT

A system and method of synchronizing clocks in a distributed network is disclosed. A simple 1-pulse-per-second timing pulse is routed to time-stamping units in each network device and utilized to measure traffic-dependent synchronization packet residence delays within network elements. Synchronization messages are updated to reflect the measured residence times, thus creating transparent clocks that can readily be synchronized across the network. The simple timing pulse architecture allows the method to be applied readily both to new designs and to retrofit existing hardware.

25 Claims, 11 Drawing Sheets

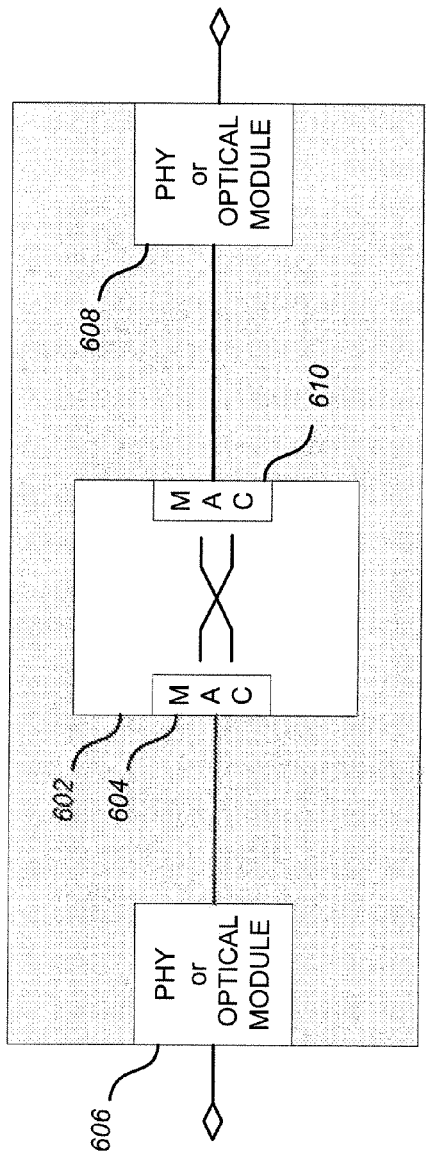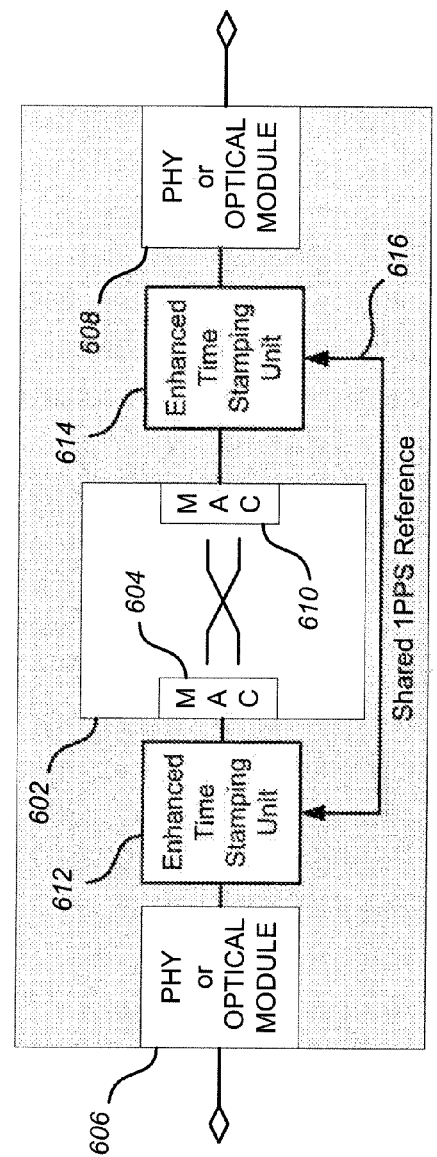
Figure 6a
Figure 6b

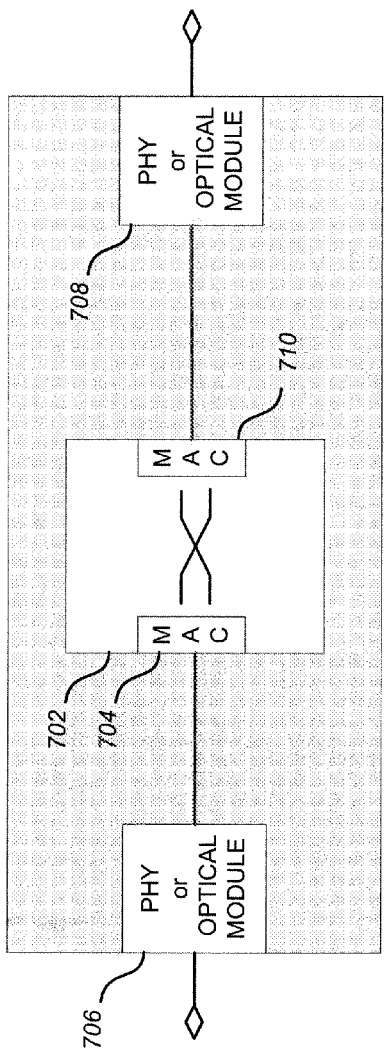
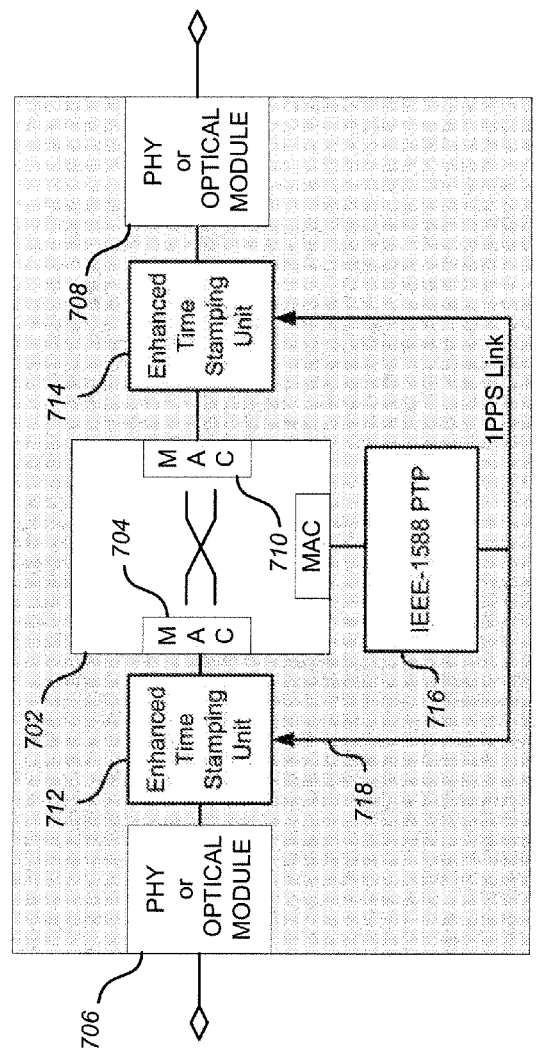
Figure 7a
Figure 7b

MEASUREMENT AND ADJUSTMENT OF REAL-TIME VALUES ACCORDING TO RESIDENCE TIME IN NETWORKING EQUIPMENT WITHOUT ACCESS TO REAL TIME

RELATED APPLICATIONS

This application claims the benefit under 35 U.S.C. §119(e) of U.S. Provisional Application No. 61/236,799, filed Aug. 25, 2009.

BACKGROUND OF THE INVENTION

1. Field of the Invention

The present invention relates to the field of synchronizing time clocks between distributed network elements, and more particularly, to adjusting packet time stamps by measuring packet residence times in network elements without access to real-time clocks.

2. Description of Related Art

Synchronizing the elements that make up a network is fundamentally important to achieving good network performance. At a basic level, synchronizing distributed clocks requires distributing timing information from a master clock to a number of slave clocks throughout the network. A number of schemes are employed in practice. For example, each network element may include its own real-time clock; synchronized to a master reference via synchronization signals. Dedicated electronic circuits may be used to generate and distribute these master clock synchronization signals to assure sufficiently high frequency accuracy and stability, and sufficiently low phase noise. For example, the IRIG-B protocol employs dedicated coaxial cables and clock drivers that distribute the clock independently of any network data connections and can achieve synchronization accuracies of a few microseconds.

A drawback of such a distribution scheme is that the dedicated clock management and distribution hardware performs only this individual function and consumes a significant fraction of the resources and cost of running a network. This has driven the industry toward timing synchronization methods that employ shared-resource packet-based Ethernet transport mechanisms for the synchronization of network elements, such as Network Time Protocol (NTP). Such packet-based synchronization schemes eliminate the need for expensive precision oscillators or GPS receiving circuits at multiple network nodes and further allow for sharing of hardware resources because timing packets and data packets can share the same physical network. But Ethernet is an inherently asynchronous protocol, posing significant challenges to using it as a basis for precise timing control. Indeed, NTP is prone to traffic-dependent latencies and timing jitter that tend to limit its accuracy to several milliseconds.

The Precision Time Protocol (PTP) IEEE-1588 standard has emerged as a protocol addressing many of the concerns associated with packet-based time synchronization of network elements. PTP addresses the time-transfer latency that arises as time-packet and data-packet traffic moves through the hubs, switches, cables and other hardware that makes up the network. Time Stamping Units, or TSUs, are employed between the Ethernet Media Access Control (MAC) or similar and the physical layer (PHY) transceiver to detect both the arrival and departure of timing packets and to mark them with a precise time stamp. One possible implementation of a PTP protocol has been developed by Semtech Corporation and is known as "ToPSync." ToPSync employs a master clock timing reference that is distributed to multiple slave clocks associated with various network nodes. A packet is time stamped and sent from the master clock to a slave clock. In turn, the slave clock sends time-stamped packets back to the master. A clock recovery algorithm recreates the master clock time base to synthesize the synchronization signals that are distributed throughout the network and filters out most of the noise and differential propagation delay inherent in the transport network. The IEEE-1588 PTP is capable of synchronizing both frequency and phase and thus can support both frequency-division duplex (FDD) and time-division duplex (TDD) systems. Typical operation involves packet "triplets" comprising a sync message sent from the master clock to a slave, followed by a delay request message from the slave to the master, and then a delay response message back from the master to the slave. Alignment of frequency requires only the sync broadcast, but alignment of the phase requires the delay request and response messages as well.

While the precision time stamping removes much of the timing uncertainty and skew within the network, packet delay variation through network elements such as switches and routers can degrade timing performance by introducing load-dependent delays and asymmetries in the forward and reverse timing paths. A method of addressing this issue is the use of transparent clocks, which are essentially switches that compensate for their own queuing delays by keeping track of the "residence time" a packet spends within the switch before being passed on. The precision time stamps in the timing packet can be updated or otherwise supplemented with the measured residence time in order to compensate for queuing delays.

However, the implementation of transparent clocks is very complex. Accurate time of day (ToD) is generally required at all of the network elements but is not always available. Time stamps corresponding to the ingress of 1588 packets must be passed through the system and must be available at the egress port for calculation. And each egress packet must be reunited with its ingress time stamp by tracing the packet through the network. Furthermore, it is often desired to retrofit PTP onto existing legacy systems that are not easily upgraded to support this capability. Accordingly, it would be useful to provide a simple system for implementing PTP transparent clocks that would overcome these challenges.

SUMMARY OF THE INVENTION

The invention provides a system and method for implementing PTP transparent clocks in a distributed network in a manner that is readily applicable to both new designs and retrofit designs. A nominally 1-pulse-per-second (1-pps) timing signal is routed from a timing pulse generator to each network element using a dedicated pulse distribution network. Local oscillators at each network element are locked to this 1-pps reference, such that the 1-pps reference provides accuracy and stability to local clocks associated with each network element.

In a first embodiment of a timing synchronization system in accordance with the present invention, a master timing unit is configured to broadcast synchronization messages with a known rate or time interval. Each synchronization message includes a master time stamp reflecting an instantaneous time value measured at the master timing unit. The synchronization message is broadcast to distributed network elements over a network data path to which the distributed network elements are connected. The connected network elements each include necessary hardware to communicate, which may comprise a physical layer (PHY), a media access control (MAC), and a time stamping unit. Each time stamping unit is further configured to include a timing pulse input that is connected to a timing pulse network, separate from the network data path. A timing pulse generator produces a 1-pps timing pulse that is distributed over the timing pulse network such that each time stamping unit receives the 1-pps timing pulse. Each time stamping unit includes a local oscillator that is locked to the 1-pps timing pulse and that drives a local slave timing clock. The local slave timing clock may be implemented as a numerically controlled oscillator. Upon receipt of a synchronization message from the master timing unit, the time stamping unit of each network element measures the arrival time of the synchronization packet and then passes it on to the core of the network element. When the synchronization packet leaves the core of the network element, the time stamping unit measures the departure time of the synchronization packet. In this way, the time stamping unit measures the residence time of the synchronization packet within the network element, for example, from ingress MAC to egress MAC, which may vary depending on network load levels. The time stamping unit then uses this residence time measurement to update the time value recorded in the synchronization packet, thereby correcting it for the variable delay within the network element. While the timing pulse reference was described above as a 1-pps reference signal, it should be appreciated that other pulse frequencies could be used and still fall within the scope and spirit of the present invention. Similarly, although the synchronization broadcast message was described as being sent regularly, any interval could be used and would still fall within the scope and spirit of the present invention.

In some embodiments, the slave timing unit may also generate a delay request packet to send back to the master timing unit. The delay request packet includes the locally measured time of arrival of the synchronization packet. The master timing unit is thus able to measure a timing difference between the master reference and the network element that includes propagation delay and any clock offset. The master timing unit may then send a delay response packet back to the network element reporting the measured delay. The network element can then correct its local clock phase to compensate for this phase difference. The operation of the invention is identical in the case that delay request and response messages are employed. In particular, just as the invention is used to correct for the residence time of synchronization messages arriving from the master timing unit, it is also used to correct for the residence time of delay request packets sent from the slave timing units back to the master.

In some embodiments of a clock synchronization system in accordance with the present invention, the master clock may be free running. In alternative embodiments, the master clock may be phase locked to a Coordinated Universal Time (UTC) reference, an International Atomic Time (TIA) timing reference, a timing reference derived from a Global Positioning Satellite (GPS) system, or any other time reference source.

In some embodiments of a clock synchronization system in accordance with the present invention, the network elements comprising the network may include Ethernet routers, hubs, switches, or other functional network elements known in the art. Such devices may have packet residence delays that are dependent on network traffic or other variables.

In other embodiments of a clock synchronization system in accordance with the present invention, the timing pulse generator includes a variable phase delay element. In one embodiment, the programmable phase delay element can be programmed to adjust the timing pulse phase by +/−16 ns or more. Of course, other programmable phase delays are possible and would similarly fall within the scope and spirit of the present invention. The programmable delay allows for compensation of routing delays between the timing pulse generator and the time stamping units within the distributed network elements.

Those skilled in the art will realize other benefits and applications of the disclosed invention, and such would also fall within the scope and spirit of the present invention. The invention is described more fully below with reference to the attached sheets of drawings, which are first described briefly below.

BRIEF DESCRIPTION OF THE DRAWINGS

FIGS. 6a and 6b illustrate how an existing switch design can be transformed into a transparent clock with the addition of enhanced time stamping according to an embodiment of the present invention;

FIGS. 7a and 7b illustrate how an existing switch design can be transformed into a boundary clock with the addition of enhanced time stamping according to an embodiment of the present invention;

DETAILED DESCRIPTION OF THE PREFERRED EMBODIMENT

Figure 1:
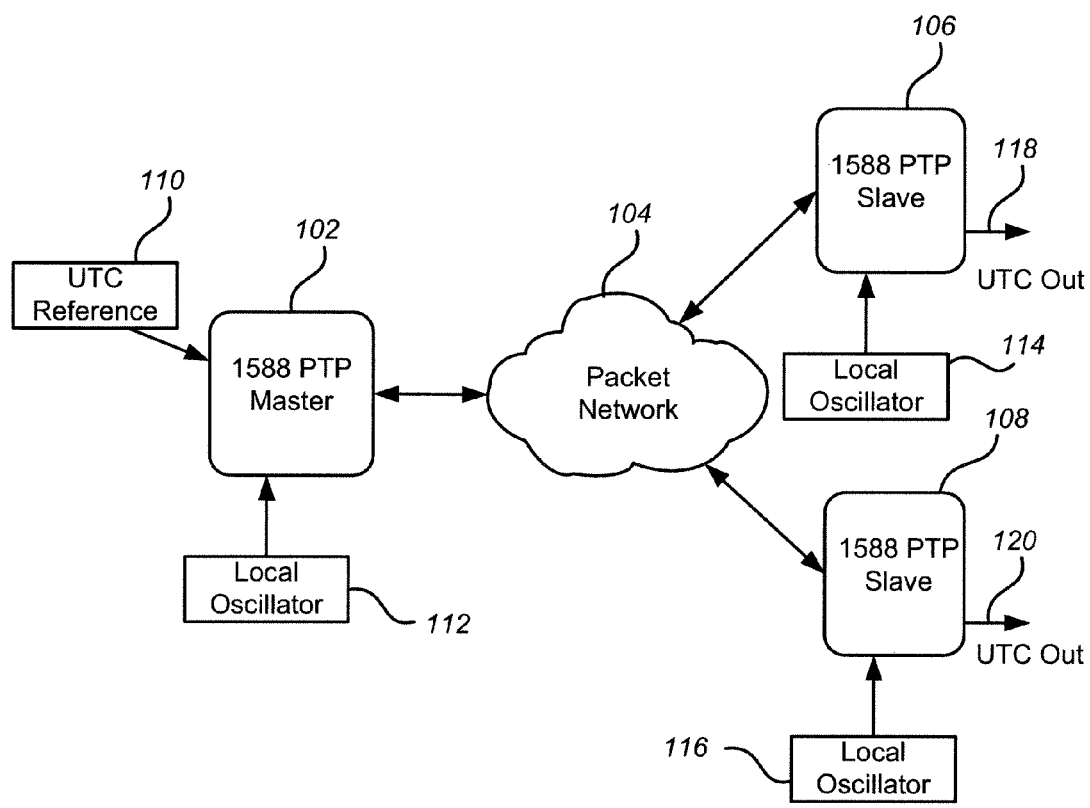
FIG. 1 is a block diagram of a typical packet-switched network using time synchronization by the IEEE-1588 protocol.

The invention provides an apparatus and method for improving PTP time recovery in packet-switched networks that can be readily applied to existing Ethernet networks. FIG. 1 depicts a typical system providing packet synchronization over a packet network using IEEE-1588. A master unit 102 may be implemented as a ToPSync unit configured to act as a master device. As such, it may receive an input from a Coordinated Universal Time (UTC) reference 110 that delivers precision real time. The UTC unit 110 may comprise a global positioning system (GPS) receiver or similar device. A master timing unit has an internal timebase driven by its own local oscillator 112. The master unit aligns its timebase with the UTC reference 110 such that it generates time-stamped time-synchronization packets that are distributed via packet network 104 to one or more slave devices 106 and 108. In one implementation, the master unit may be a ToPSync module. However, the invention is equally applicable to other implementations of IEEE-1588 PTP. The timebase alignment may be achieved digitally by using, for example, a numerically controlled oscillator. Other methods of timebase alignment known in the art may also be employed. Slave devices 106 and 108 may comprise ToPSync modules configured to operate in slave mode or may comprise other implementations of timing modules consistent with IEEE-1588. As such, they include local time stampers that stamp received packets with local time based on their own local oscillators 114 and 116. Based on an algorithm discussed further below, the slave units 106, 108 can use local numerically controlled oscillators and filters to synchronize local time to the master reference. Once synchronized, the slave devices may deliver UTC time 118, 120 to other units, or might, for example, serve as masters for additional subnetworks (not shown).

While the foregoing system has been described with reference to a UTC time source, it should be appreciated that UTC is only one exemplary time epoch that can be transported using the present invention. Systems transporting time or frequency references of any origin would similarly fall within the scope and spirit of the present invention. Other examples of such time epochs include International Atomic Time (TAI), and time references from global positioning satellite systems (GPS), or any other time source known in the art. In other embodiments in accordance with the present invention, the master timing unit may simply free run, with no connection to an external time source. All such embodiments would fall within the scope and spirit of the present invention.

Figure 2A:
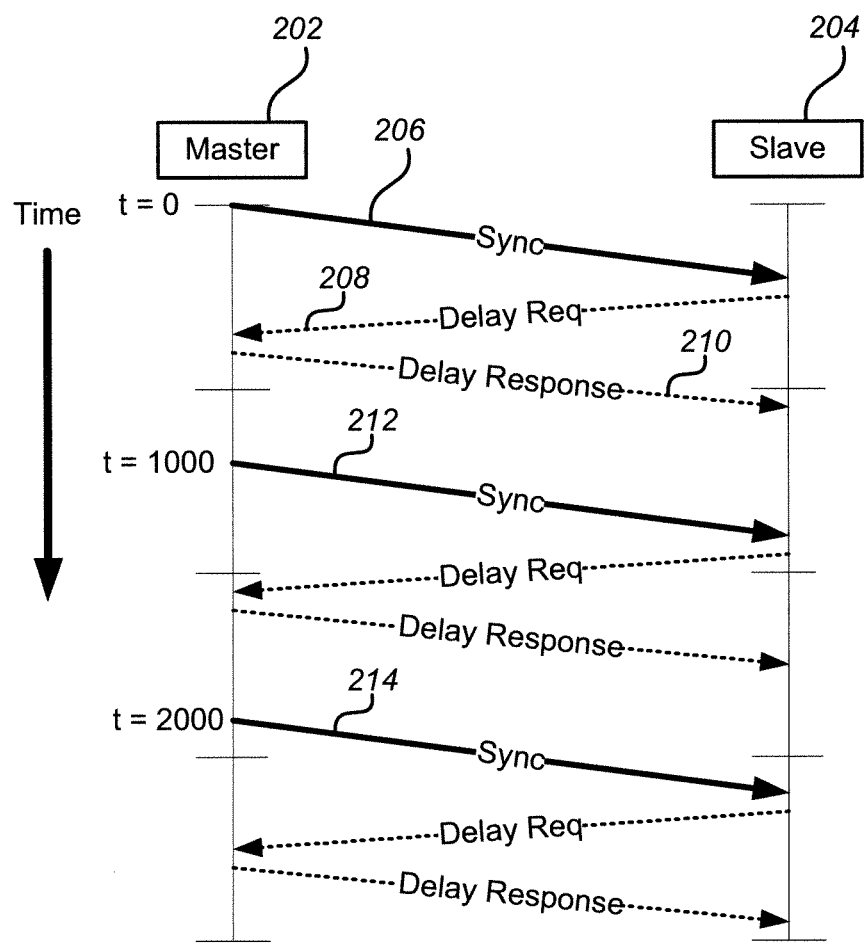
FIG. 2a depicts a typical exchange of synchronization packets between a master and slave node.

In accordance with an embodiment of the present invention, the synchronization algorithm generally proceeds as shown in FIG. 2a. The master unit 202 sends out a sync message 206 on an approximately regular schedule. For example, as shown in FIG. 2, sync messages 206, 212, and 214 are sent at a known time interval. The particular interval selected is not important to invention. It is similarly not necessary that the interval be regular. The slave device 204 receives the time-stamped sync message 206 and may send back a delay request packet 208 to the master 202. The master then responds with a delay response packet 210. Receipt of the sync messages allows the slaves to align their local timebases to the frequency of the master clock, and the additional delay request and response packets allow the slaves to further align local clock phase to the master clock, for complete synchronization. In other words, the sync message is sufficient for frequency alignment between the master and slave units, but the delay request and delay response messages are required in order to achieve phase synchronization as well.

Figure 2B:
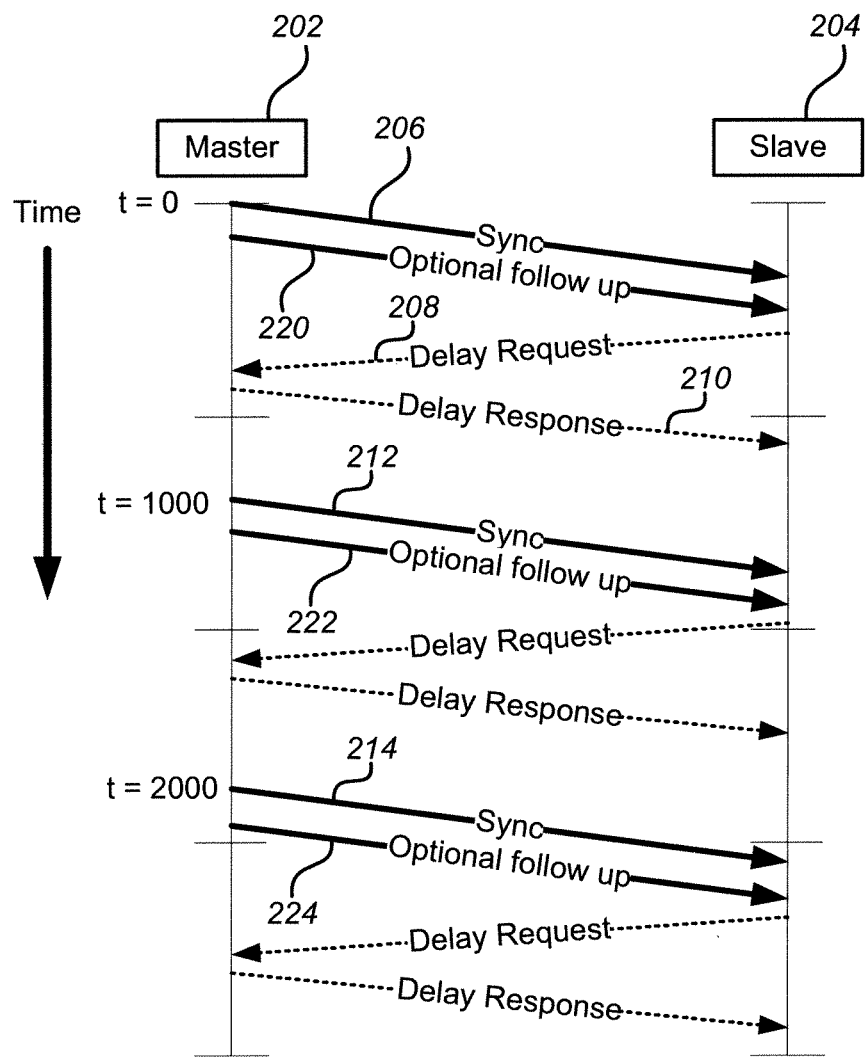
FIG. 2b depicts an alternative embodiment of a synchronization packet exchange protocol including an optional follow up message.

FIG. 2b is an alternative embodiment of a synchronization algorithm in accordance with the present invention that adds an optional follow-up message 220, 222, or 224. This follow-up message may be used to transmit the time stamp associated with the sync message so that it is not necessary to include the timestamp with the sync message itself.

Figure 3A:
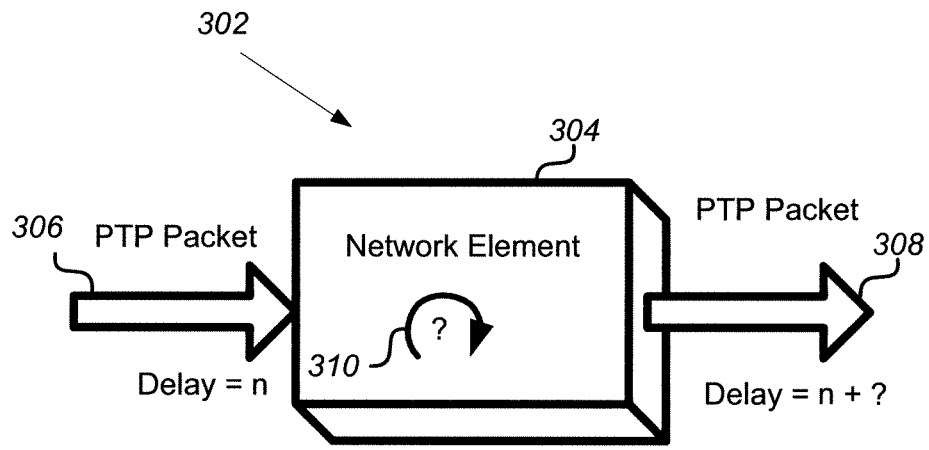
FIGS. 3a and 3b depict the movement of a PTP timing packet through a network element, illustrating the need for residence time measurement in accordance with an embodiment of the present invention.

A difficulty with the systems shown in FIGS. 1, 2a, and 2b is that network elements, such as routers, switches, hubs, etc., may introduce delays into the system. These delays are often dependent on network traffic levels, as packets may be queued within a network element while other packets are being transmitted. The resulting delays can introduce large synchronization errors that are not easily compensated. FIG. 3a is a schematic block diagram illustrating this phenomenon. In a network segment 302, a timing packet 306 enters network element 304, which may include a router, switch, hub or other device. The network element 304 has an unknown and variable delay 310 that depends on the packet traffic volume and the amount of queuing present. When the timing packet 308 emerges from the network element 304, its time stamp is inaccurate by the amount of the unknown delay 310 added within the network element 304.

Figure 3B:
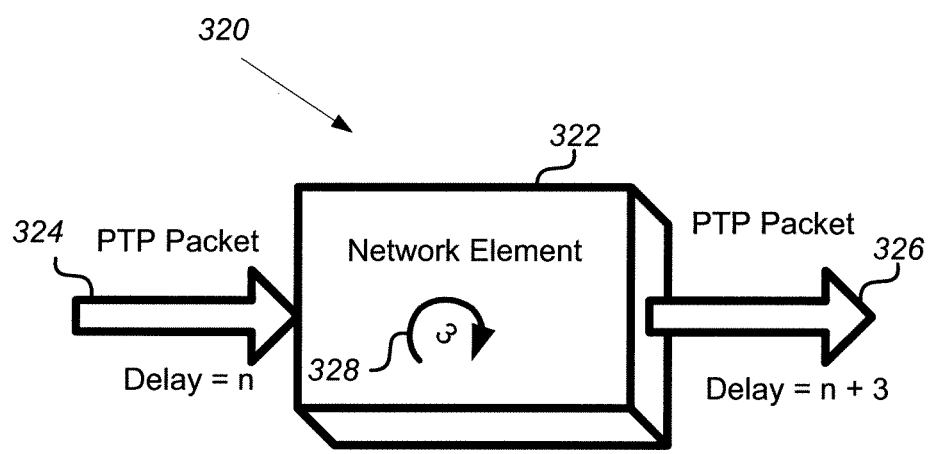

FIG. 3b depicts an improvement on this system that is achieved by accurately measuring the time the timing packet is in residence within the network element. Timing packet 324 enters network element 322 and is stamped with a delay value of n. An internal clock 328 measures the time the packet stays resident within the network element, measured as 3 timing units in this example. Upon exit from the network element 322, the timing packet 326 is stamped with an updated delay of n+3, thus compensating for the measured delay and maintaining good timing accuracy. In an IEEE-1588 system, this is the function of what is known as a "transparent clock," which adds the packet residence time to a value in a data field known as the "correction field." The correction field is then used by the slave to correct for the perceived packet delay prior to processing within the slave timing algorithm.

Figure 4:
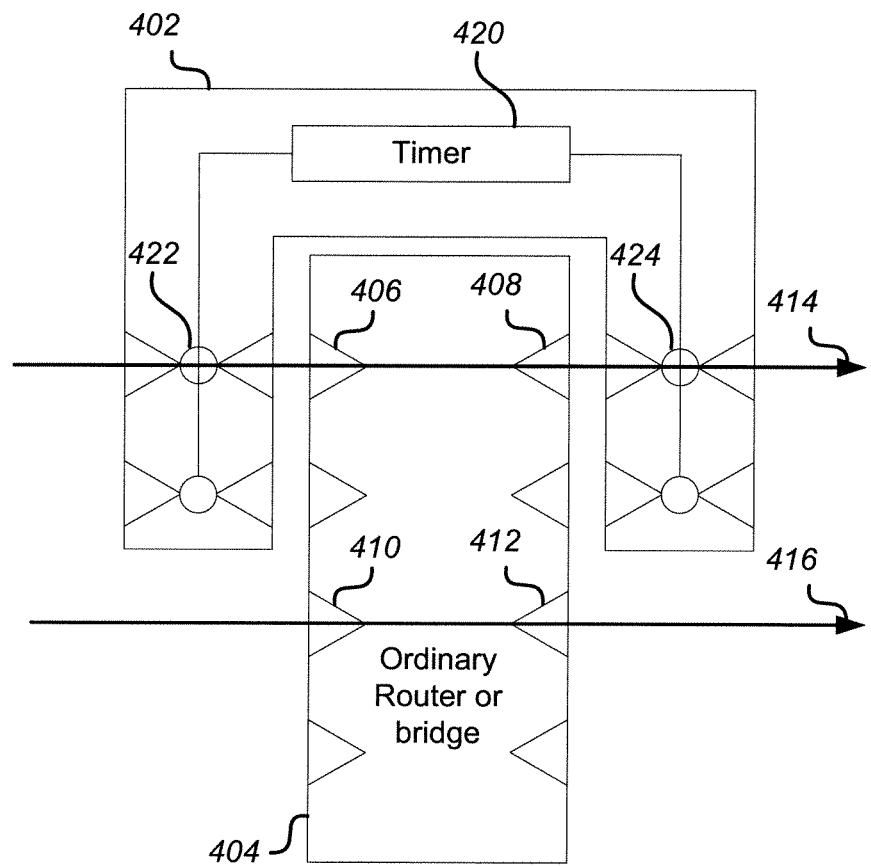
FIG. 4 illustrates one proposed solution for creating PTP transparent clocks from an ordinary router or other network device that has the disadvantage of hardware and software complexity.

In practice, employing such a transparent clock scheme can be challenging, especially when it is desired to update a legacy system with hardware that may not support the accurate measurement of residence time within a network element. Some researchers have proposed "spider transparent clocks," which are devices that straddle existing network elements in order to provide the required timing measurement capability. See, for example, Eidson, et al., ISPCS 2008 IEEE Symposium on Precision Clock Synchronization for Measurement, Control, and Communication, Ann Arbor, Mich., Sep. 22-26, 2008. An example of such a "spider" is illustrated in FIG. 4. An ordinary 8-port legacy router or bridge 404 does not have the capability to measure packet residence time. Thus, packet 416 passing through the bridge will suffer uncompensated delays that will decrease the accuracy of its time stamps. A spider device 402 is inserted around four of the bridge ports such that a packet 414 will first pass through an entry time-stamp port 422 before entering the bridge at port 406. After exiting the bridge at port 408, the packet 414 will pass through an exit time-stamp port 424. The spider includes a timer 420 that measures the transit time from the spider entry port 422 to the exit port 424, allowing the packet's correction field to be accurately updated.

A disadvantage of this system is that the points of ingress and egress of all data packet routes that need to include timing correction must be connected to a common interval timer. This requires complex synchronization procedures that involve data, hardware and software.

Figure 5:
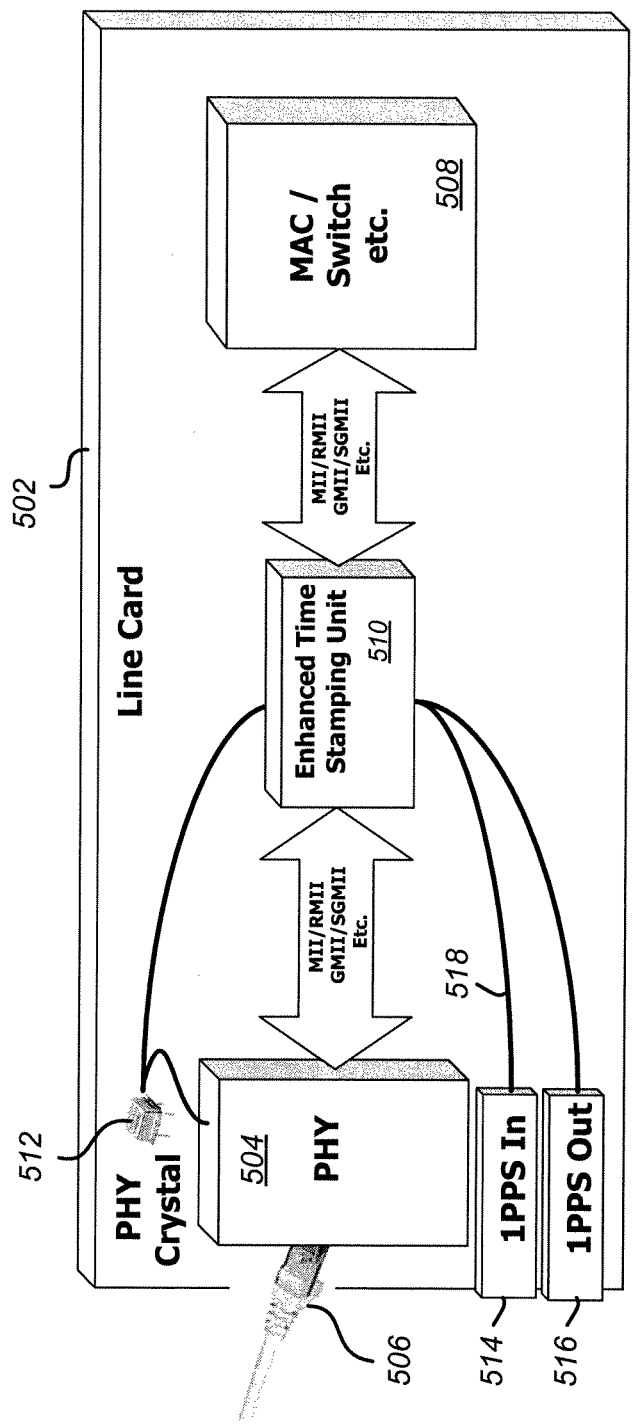
FIG. 5 illustrates a simple solution in accordance with an embodiment of the present invention for providing accurate residence time measurements.

A novel and simple method of creating transparent clocks from legacy equipment that overcomes these difficulties is presented in FIG. 5 in accordance with an embodiment of the invention. A typical line card 502 includes a PHY 504 layer connected to an Ethernet network 506, and a MAC as an entry point to a switch, hub, or other network device 508 for processing data packets. An enhanced time stamping and correction circuit 510 is installed at each network port between the PHY 504 and the MAC 508 to enable timing compensation in accordance with the present invention. One implementation of such an enhanced time stamping circuit is known as ToP-Stamp. However, the invention is not limited to that specific implementation. All of the enhanced time stamping devices share a 1 pulse-per-second (1-pps) timing signal that may be generated by a master enhanced time stamping device or by any other source. A crystal 512 inherent in the PHY may provide the oscillator reference, and the 1-pps timing signal provides the accuracy and timing precision. The main advantage of such a system is that no data transfer is required; all of the timing information is carried in the existing PTP timing packet. All that is required is the simple interconnection 518 of the 1-pps reference to all of the enhanced time stamping devices in the system. The 1-pps enters the line card 502 at port 514 and exits at port 516. This eliminates setup and configuration issues and provides a transparent clock capability that is completely autonomous.

The 1-pps reference can be sourced by a master enhanced time stamping device as mentioned earlier. Alternatively, it may be synchronized to an already-existing internal timebase. This system supports all of the IEEE-1588 PTP packet protocols and can perform one-step "on the fly" time stamping (see FIG. 2*a*, element 206), or two-step synchronization including the use of follow-up messaging (FIG. 2*b*, elements 206, 220, 212, 222, 214 and 224). The system is also self-configuring, and the 1-pps reference can be offset by a programmable delay in order to compensate for routing delay between the PPS reference 514 and the all of the enhanced time stamping devices 510 in the system. In one embodiment, the delay is programmable to +/−16 ns, but other programmable delays are possible. With such a system, residence times can be measured with an accuracy better than 10 ns.

FIGS. 6*a* and 6*b* further illustrate how enhanced time stamping is used to create a transparent clock in accordance with an embodiment of the invention. FIG. 6*a* illustrates a typical network switch. For example, a packet may arrive at the PHY 606 and be routed to a MAC 604 of a network switch 602. The packet may suffer an unknown delay passing through the network switch 602 before it egresses through MAC 610 and PHY 608. FIG. 6*b* illustrates an embodiment in accordance with the present invention that corrects for this variable network switch delay. Enhanced time stamping modules 612 and 614 are placed between the MAC and PHY (i.e., between PHY 606 and MAC 604 and between MAC 610 and PHY 608). At packet ingress, a packet arriving at PHY 606 is first tagged with a time stamp by enhanced time stamping unit 612. The packet then suffers some unknown delay within the core of the network element 602. Upon packet egress from MAC 610, enhanced time stamping unit 614 examines the packet to see if it had been stamped with a time value at ingress. If so, the enhanced time stamping unit 614 can calculate a new timestamp, taking into account the delay through the network element 602. It then removes the ingress timestamp and replaces it with a new timestamp that accounts for the delay and passes the packet on to the PHY 608 on the network port. Thus, in accordance with an embodiment of the invention, the addition of enhanced time stamping elements 612 and 614 convert the network switch of FIG. 6*a* into the transparent clock switch of FIG. 6*b*.

FIGS. 7*a* and 7*b* similarly illustrate how a standard network switch depicted in FIG. 7*a* is converted into a boundary clock in accordance with an embodiment of the present invention. In FIG. 7*a*, a standard network switch includes PHY layers 706 and 708 connected to network ports. Between them is the core of the switch itself 702 with MACs 704 and 710 connecting the switch 702 to the PHY layers 706 and 708.

FIG. 7*b* illustrates how this switch is converted into a boundary clock by the addition of enhanced time stamping and IEEE-1588 PTP hardware in accordance with an embodiment of the invention. IEEE-1588 PTP element 716 provides a local clock function and also sources a 1 PPS signal 718 to enhanced time stamping units 712 and 714, placed between the PHY and MAC layers. Thus, as packets flow through the network ports to and from the IEEE-1588 PTP element 716, the enhanced time stamping devices 712 and 714 allow the IEEE-1588 PTP element 716 to compensate for the delay in transporting the packets to or from the core of the network element 702. This mitigates the packet delay variation within the network element.

Figure 8A:
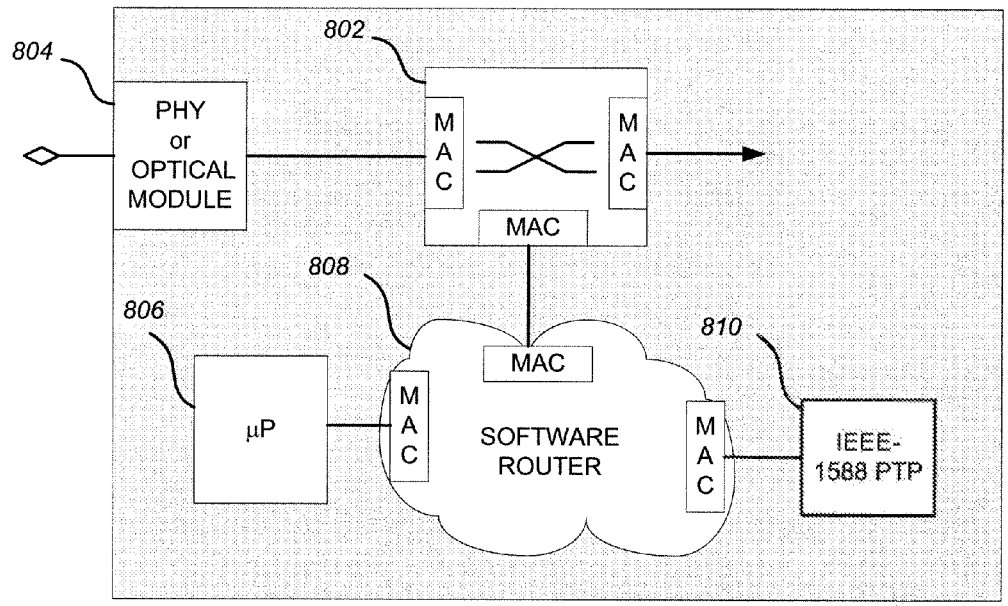
FIGS. 8a and 8b illustrate how the packet delay variation introduced by a software router can be eliminated by the addition of enhanced time stamping in accordance with an embodiment of the present invention.
Figure 8B:
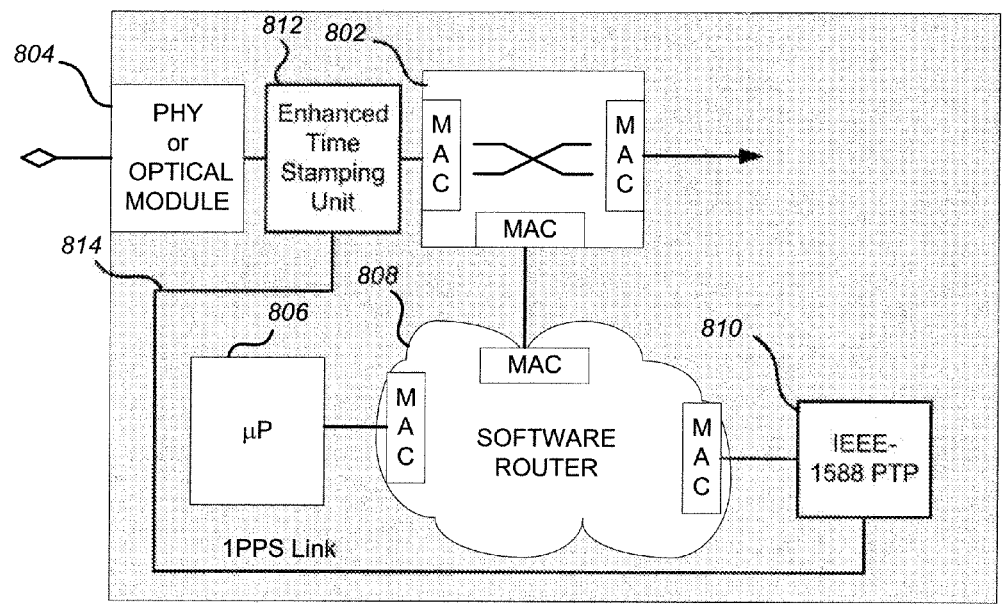

FIGS. 8*a* and 8*b* illustrate another example of how enhanced time stamping is used to improve the timing performance of a network element. FIG. 8*a* depicts a network router 802 that is operated by software 808 coupled to a microprocessor 806. Although the IEEE-1588 PTP element 810 can provide an accurate time stamp, the software router can introduce orders of magnitude of increased packet delay variation into the system. In FIG. 8*b*, however, an enhanced time stamping unit 812 is placed between the PHY 804 and MAC layer of the router 802. Thus, as packets flow through the network ports to and from the IEEE-1588 PTP element 810, the enhanced time stamping unit 812 enables compensation of the delay in transporting the packets through the router element 802. This dramatically improves the packet delay variation and makes the software router operate as if it were a hardware router. While this application is similar to the creation of a transparent clock, the enhanced time stamping element 812 in this case measures the time taken to transport the packets in between the port and the IEEE-1588 PTP element 810. This allows flexibility in the location of the synchronization system such that even packets that are re-routed by a software-based process, which is generally very bad for PTP performance, can have their delays compensated to reduce packet delay variation.

Figure 9:
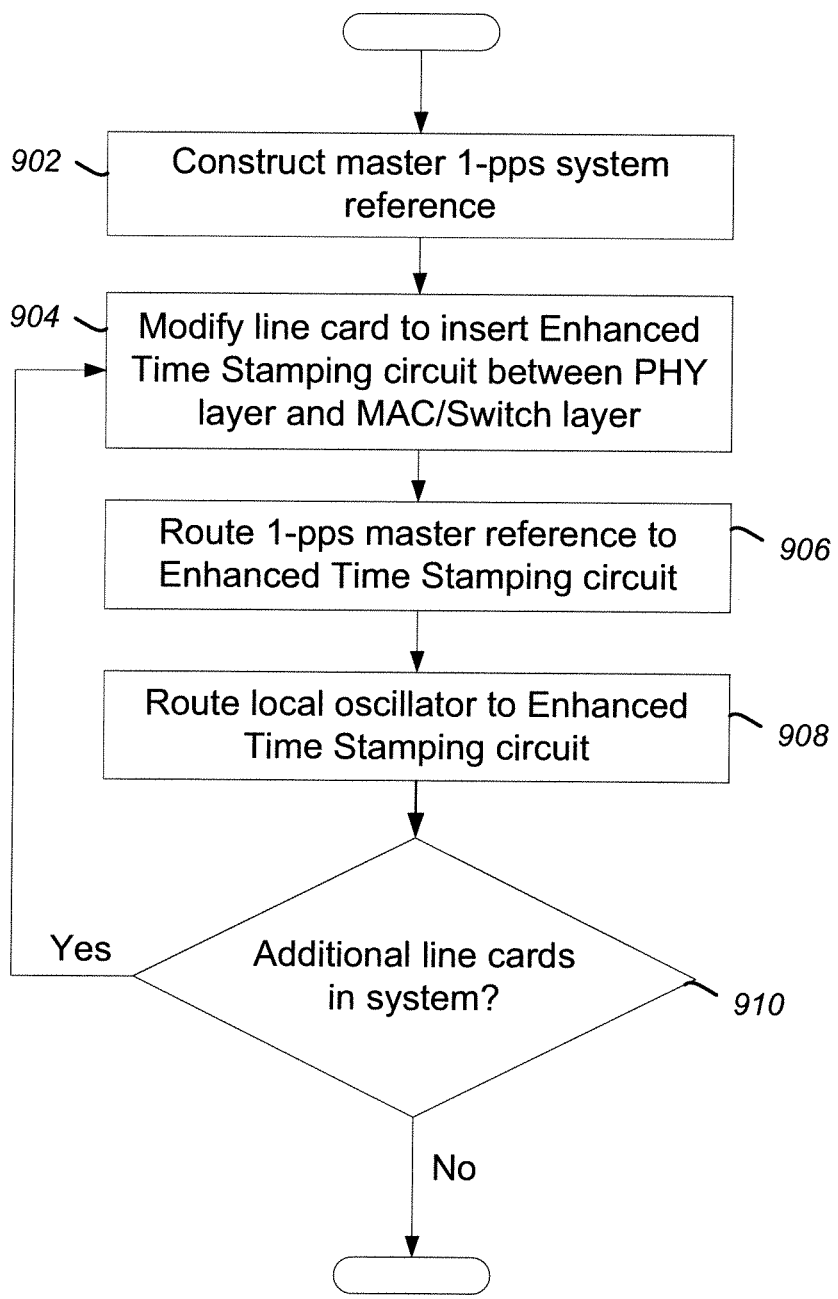
FIG. 9 is a flow chart describing an exemplary process of retrofitting legacy hardware to incorporate enhanced time stamping in accordance with an embodiment of the present invention.

FIG. 9 is a flowchart depicting an exemplary method of retrofitting legacy equipment with enhanced time stamping in accordance with an embodiment of the present invention. At step 902, a master reference is created to source the 1-pps precision timing reference for the system by using an enhanced time stamping device or an existing timing reference, as discussed earlier. At step 904, a line card of the system is modified to insert an enhanced time stamping circuit between the PHY layer and the MAC of a switch, router, or other network device installed on the line card. Next, the 1-pps master reference is routed to the enhanced time stamping device at step 906 to provide the timing precision for the system. At Step 908, a local oscillator already on the line card, or alternatively, a new crystal oscillator circuit, is routed to the enhanced time stamping device. Step 910 then checks whether other line cards or network devices are present in the system. If yes, the process returns to step 904, and the remaining line cards in the system are modified to incorporate the enhanced time stamping circuit until no unmodified cards remain.

Figure 10:
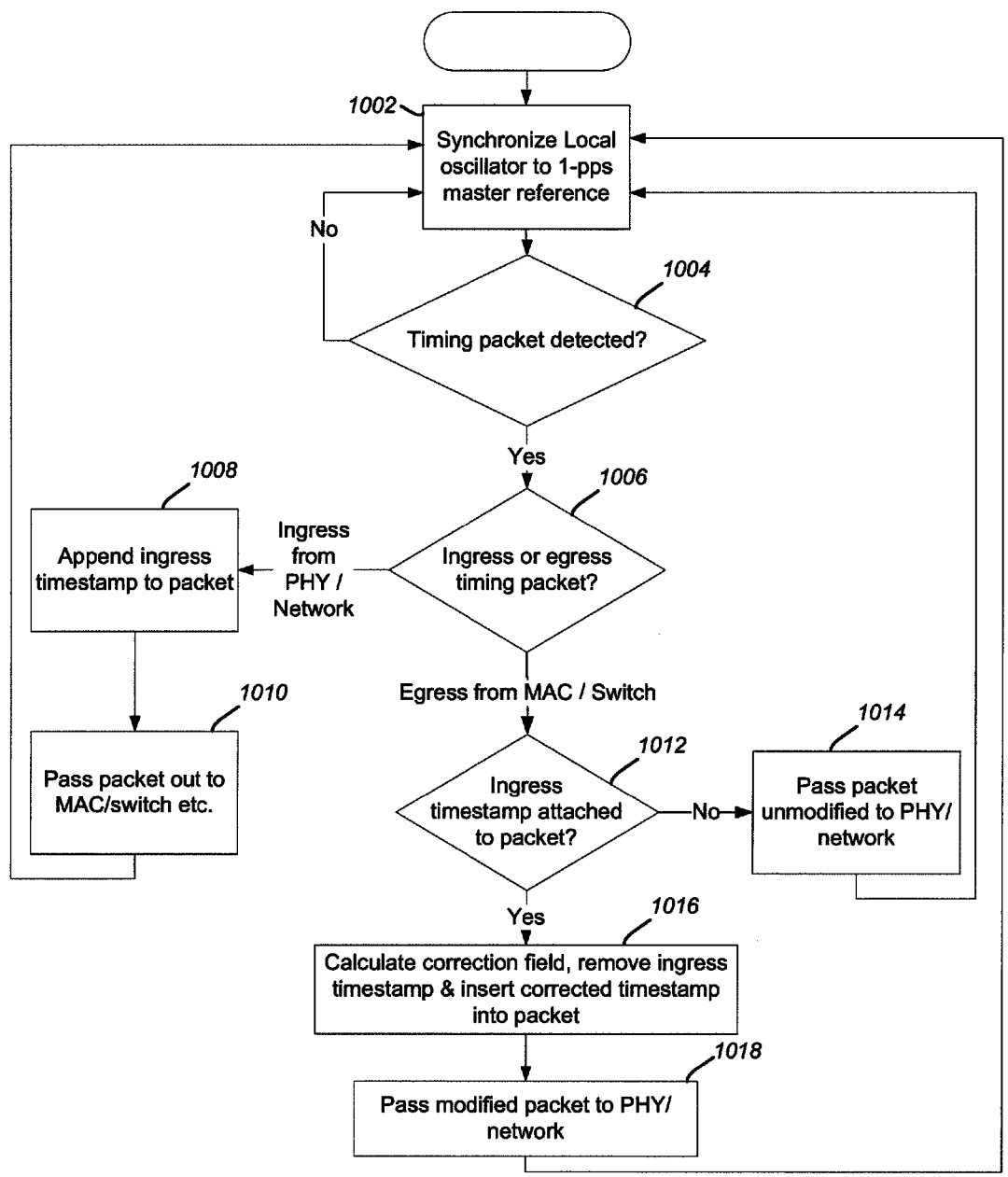
FIG. 10 is a flow chart describing an exemplary process in accordance with an embodiment of the present invention for receiving and time stamping a timing packet to compensate for packet delay variation.

FIG. 10 describes the operation of a line card that has been designed or modified to include enhanced time stamping elements in accordance with an embodiment of the present invention. At step 1002, the internal timebase (driven by the local oscillator coupled to the enhanced time stamping device) is synchronized to the 1-pps master reference using methods well known in the art. At step 1004, the system checks whether a timing packet has arrived at the network port and been detected by the enhanced time stamping device. If not, the process returns to step 1002, and when a timing packet arrives, the process proceeds to step 1006. At step 1006, the enhanced time stamping device determines whether the packet is an ingress or egress packet, that is, whether the packet is moving from the PHY to the core of the network element (ingress) or from the core of the network element out to the PHY and network port (egress). If the packet is an ingress packet, the process proceeds to step 1008, and an ingress timestamp is simply appended to the packet. The process then proceeds to step 1010, and the packet is passed on to the MAC, switch or other network element. The process then proceeds back to step 1002 and continues to maintain the local oscillator in synchronization with the 1-pps reference. If the packet detected at step 1006 is an egress packet, the process proceeds to step 1012, where the process determines whether that packet actually entered the network device through a port equipped with an enhanced time stamping device and therefore whether it has an attached ingress timestamp. If not, the process proceeds to step 1014, and the packet is simply passed on to the PHY and network port unchanged, after which the process returns to step 1002. If the packet does have an ingress stamp, the process proceeds to step 1016. At step 1016, the ingress timestamp is compared to the current time to calculate a time correction value representing the residence time of the packet within the network element or whatever variable path element is being measured. The ingress timestamp is then removed, and a new corrected timestamp is inserted into the packet and the process proceeds to step 1018. At step 1018, the packet having the modified timestamp is passed along to the PHY and network node, and the process then returns to step 1002.

In conclusion, a simple, cost effective method of implementing transparent PTP clocks in a network system is presented that requires only the simple wired interconnect of a 1-pps reference. The system requires no setup and configuration and eliminates the complexities of involving hardware, software, and packet data in the residence time measurement process. Those skilled in the art will likely recognize further advantages of the present invention, and it should be appreciated that various modifications, adaptations, and alternative embodiments thereof may be made within the scope and spirit of the present invention. The invention is solely defined by the following claims.

What is claimed is:

1. A system for synchronizing time clocks within a distributed network, comprising:
   a master timing unit configured to broadcast a synchronization message with a known time interval, the synchronization message including a master time stamp reflecting an instantaneous time value measured at the master timing unit;
   a network data path connected to the master timing unit and providing a data path for the synchronization message;
   at least one network device connected to the network data path and adapted to receive the synchronization message, the network device comprising:
      a network core element; and
      a time stamping unit;
   a time pulse generator configured to output a periodic timing pulse; and
   a time pulse distribution network connecting the time pulse generator to the time stamping unit of the at least one network device; wherein
      the time pulse network is separate from the network data path;
      the time stamping unit further includes a timebase based on a local oscillator that is locked to the periodic timing pulse of the time pulse generator and used to drive a local slave time clock; and
      the time stamping unit is further adapted to:
         utilize the local slave time clock to measure a time interval between an arrival of the synchronization message at the network core element and a departure of the synchronization message from the network core element, in order to calculate a residence time of the synchronization message within the network core element; and
         update the synchronization message to add a time offset to the master time stamp that corresponds to the residence time within the network core element;
      wherein:
         the at least one network device is further configured to send a delay request packet back to the master timing unit through the network data path upon receiving the synchronization message from the master timing unit, wherein the delay request packet includes a time stamp reflecting a time measured by the local slave time clock when the delay request message leaves the at least one network device;
         the master timing unit is further configured to send a delay response packet back to the at least one network device that includes a time stamp reflecting a time at which the delay request packet arrived at the master timing unit; and
         the at least one network device is further configured to calculate a transport time of the synchronization message from the master timing unit and to shift a phase of the local slave time clock to compensate for the transport time of the synchronization message.

2. The time clock synchronization system of claim 1, wherein the time stamping unit is implemented as a numerically controlled oscillator locked to the periodic timing pulse of the time pulse generator.

3. The time clock synchronization system of claim 1, wherein the master timing unit is synchronized to a Coordinated Universal Time (UTC) timing reference.

4. The time clock synchronization system of claim 1, wherein the master timing unit is synchronized to an International Atomic Time (TIA) timing reference.

5. The time clock synchronization system of claim 1, wherein the master timing unit is synchronized to a timing reference obtained from a Global Positioning Satellite (GPS) receiver.

6. The time clock synchronization system of claim 1, wherein the periodic timing pulse from the time pulse generator has a frequency of approximately 1 Hz.

7. The time clock synchronization system of claim 1, wherein the known time interval between successive synchronization messages is a regular interval.

8. The time clock synchronization system of claim 1, wherein the network core element is one of a network router, a network hub, a network switch, a network path between a network port and a timing synchronization circuit, and a network path between the timing synchronization circuit and a network element.

9. The time clock synchronization system of claim 8, wherein the timing synchronization circuit comprises a ToPSync circuit.

10. The time clock synchronization system of claim 1, wherein the time pulse generator is further adapted to include a programmable phase offset to compensate for routing delay between the time pulse generator and the at least one network element.

11. The time clock synchronization system of claim 10, wherein the programmable phase offset can be varied from −16 ns to +16 ns.

12. In a distributed network system, a method of synchronizing time clocks among network elements comprises:
   phase locking an IEEE1588 master timing reference to an external time source;

preparing synchronization data packets at the master timing reference on a periodic basis that include a time stamp from the master timing reference;
broadcasting the synchronization data packets on the periodic basis to at least one network element of the distributed network system over a data network;
generating a timing pulse on a regular interval;
routing the timing pulse to at least one of the network elements of the distributed network system over a timing pulse network that is separate from the data network;
locking a local time stamping unit at the at least one network element to the timing pulse arriving via the timing pulse network;
detecting an ingress of an IEEE1588 event packet comprising at least one of an IEEE1588 SYNC and an IEEE1588 DELAY REQUEST message;
utilizing the local time stamping unit to modify the ingressing IEEE1588 event packet to contain a time stamp reflecting a time measured by the local time stamp clock;
detecting an egress of the IEEE1588 event packet;
determining whether the data packet at egress had been stamped with an ingress time stamp and if so:
  utilizing the local time stamping unit to calculate a time interval between the ingress and egress of the data packet;
  removing the ingress time stamp;
  restoring the event data packet to its original form; and
  modifying the restored packet to add data that corresponds to the time interval between the ingress and egress times of the data packet.

13. The synchronization method of claim 12, wherein the step of phase locking a master timing reference to an external time source further comprises locking the master timing reference to a source of Coordinated Universal Time (UTC).

14. The synchronization method of claim 12, wherein the step of phase locking a master timing reference to an external time source further comprises locking the master timing reference to a source of International Atomic Time (TIA).

15. The synchronization method of claim 12, wherein the step of phase locking a master timing reference to an external time source further comprises locking the master timing reference to a time reference derived from a Global Positioning Satellite (GPS) system.

16. The synchronization method of claim 12, wherein the steps of preparing and broadcasting synchronization data packets on a periodic basis further comprises preparing and broadcasting synchronization data packets at a regular interval.

17. The synchronization method of claim 12, wherein the step of generating a timing pulse on a regular interval further comprises generating a timing pulse at a rate of approximately one pulse per second.

18. The synchronization method of claim 12, wherein the step of generating a timing pulse on a regular interval further comprises providing an adjustable phase delay circuit to allow a phase of the timing pulse to be selectively adjusted.

19. The synchronization method of claim 18, wherein the phase of the timing pulse can be selectively adjusted from −16 ns to +16 ns.

20. In a distributed network system, a method of synchronizing time clocks among network elements comprises:
phase locking a master timing reference to an external time source;
preparing synchronization data packets at the master timing reference on a periodic basis that include a time stamp from the master timing reference;
broadcasting the synchronization data packets on the periodic basis to at least one network element of the distributed network system over a data network;
generating a timing pulse on a regular interval;
routing the timing pulse to at least one of the network elements of the distributed network system over a timing pulse network that is separate from the data network;
locking a local slave oscillator at the at least one network element to the timing pulse arriving via the timing pulse network;
utilizing the local slave oscillator to measure an arrival time and a departure time of the synchronization data packet arriving via the data network;
calculating a residence time of the synchronization data packet within the at least one network element;
modifying the synchronization data packet to add a time value corresponding to the residence time of the synchronization data packet within the at least one network element;
generating a delay request packet at the at least one network element upon receipt of the synchronization data packet from the master timing reference, wherein the delay request packet includes a time stamp reflecting a time measured at the at least one network element;
sending the delay request packet back to the master timing reference;
preparing a delay response packet at the master timing reference including a time stamp reflecting a time at which the delay request packet arrived at the master timing reference;
sending the delay response packet back to the at least one network element;
calculating a transport time of the synchronization data packet; and
adjusting a local time clock locked to the local oscillator at the at least one network element to compensate for the calculated transport time.

21. In a distributed network system including a local clock, a distributed timing reference, and a time stamping circuit, a method of compensating for variable packet delays includes the steps of:
synchronizing the local clock to the distributed timing reference;
detecting an IEEE1588 event packet comprising at least one of an IEEE1588 SYNC or an IEEE1588 DELAY REQUEST message at the time stamping circuit;
determining whether the IEEE1588 event packet is an ingress timing packet or an egress timing packet;
when the event packet is an ingress timing packet, modifying the IEEE1588 event packet to include an ingress time stamp;
when the IEEE 1588 event packet is an egress event packet, performing the steps of:
  determining whether the event packet includes an ingress time stamp; and
  when the event packet includes an ingress time stamp, performing the steps of:
    removing the ingress time stamp;
    restoring the event packet to its original form
    calculating a timing correction value based on the ingress time stamp and the egress time; and
modifying the restored time stamp to offset it by an amount corresponding to the timing correction value based on the difference between the egress time and the ingress time stamp; wherein the step of determining whether the IEEE1588 event packet is an ingress packet or an egress packet further includes the steps of:
- determining if the IEEE1588 event packet is en route from a PHY to a MAC of a network element; and
- determining if the IEEE1588 event packet is en route from a MAC of a network element to a PHY.

22. The method of compensating for variable packet delays of claim 21 wherein the step of synchronizing the local clock to the distributed timing reference includes the steps of:
- providing a local oscillator driving a numerically controlled oscillator operating as the local clock;
- filtering frequency and phase offsets between the numerically controlled oscillator and the distributed timing reference to generate a digital correction value;
- updating the numerically controlled oscillator with the digital correction value.

23. In a distributed network system including a local clock, a distributed timing reference, and a time stamping circuit, a method of compensating for variable packet delays includes the steps of:
- synchronizing the local clock to the distributed timing reference;
- detecting an IEEE1588 event packet comprising at least one of an IEEE1588 SYNC or an IEEE1588 DELAY REQUEST message at the time stamping circuit;
- determining whether the IEEE1588 event packet is an ingress timing packet or an egress timing packet;
- when the event packet is an ingress timing packet, modifying the IEEE1588 event packet to include an ingress time stamp;
- when the IEEE1588 event packet is an egress event packet, performing the steps of:
  - determining whether the event packet includes an ingress time stamp; and
  - when the event packet includes an ingress time stamp, performing the steps of:
    - removing the ingress time stamp;
    - restoring the event packet to its original form
    - calculating a timing correction value based on the ingress time stamp and the egress time; and
  - modifying the restored time stamp to offset it by an amount corresponding to the timing correction value based on the difference between the egress time and the ingress time stamp; wherein
  - the step of determining whether the IEEE1588 event packet is an ingress packet or an egress packet further includes the steps of:
    - determining if the timing packet is en route from a PHY to a timing synchronization element; and
    - determining if the timing packet is en route from a timing synchronization element to a network element.

24. The method of compensating for variable packet delays of claim 23, wherein the timing synchronization element comprises a ToPSync device.

25. The method of compensating for variable packet delays of claim 23 wherein the step of synchronizing the local clock to the distributed timing reference includes the steps of:
- providing a local oscillator driving a numerically controlled oscillator operating as the local clock;
- filtering frequency and phase offsets between the numerically controlled oscillator and the distributed timing reference to generate a digital correction value;
- updating the numerically controlled oscillator with the digital correction value.

* * * * *